Figure 1:
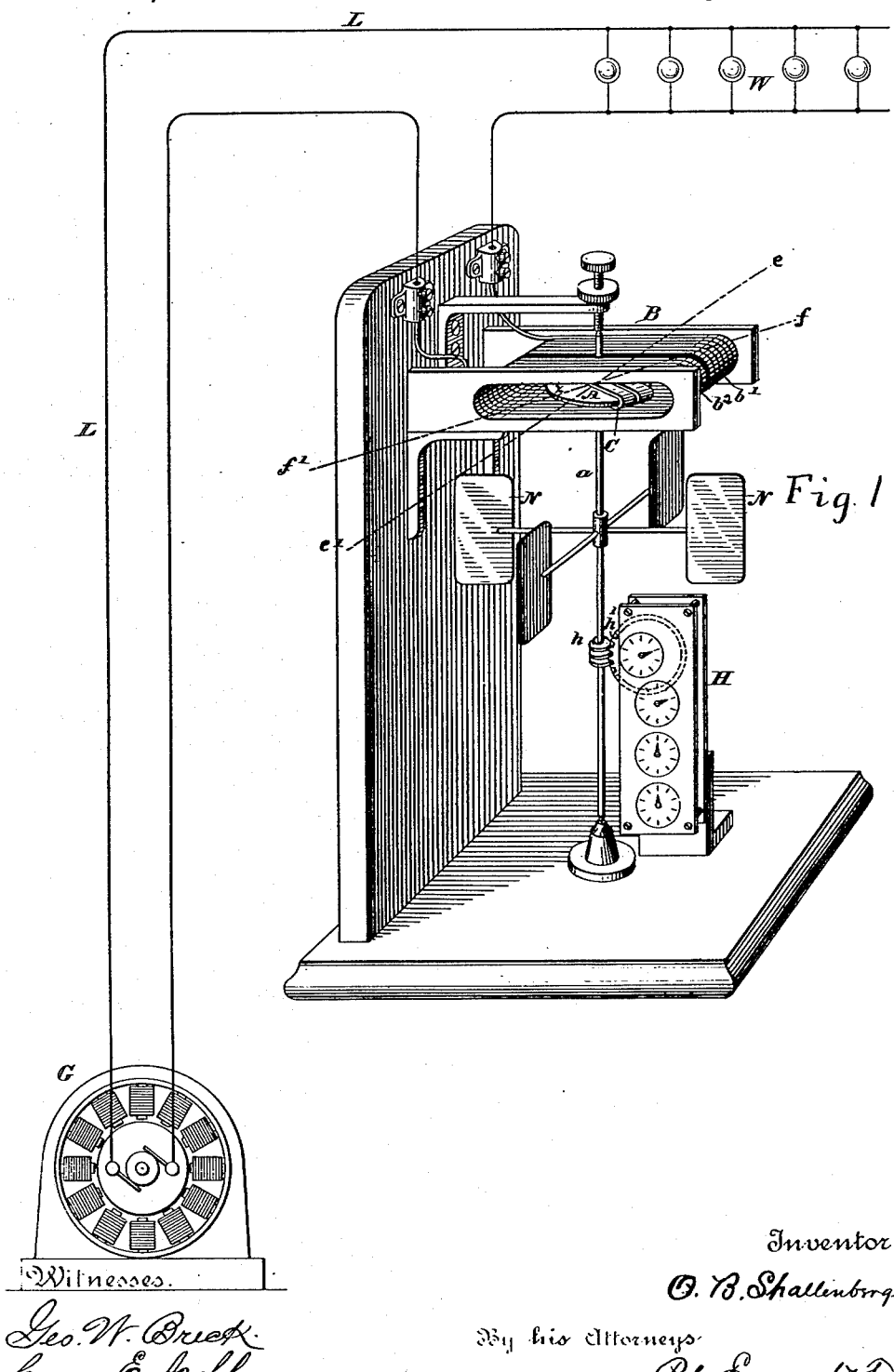

(No Model.) 3 Sheets—Sheet 1.

O. B. SHALLENBERGER.
METER FOR ALTERNATING ELECTRIC CURRENTS.

No. 388,003. Patented Aug. 14, 1888.

Witnesses.
Geo. W. Breck.
Carrie E. Ashley.

Inventor.
O. B. Shallenberger.
By his Attorneys
Pope Edgecomb & Terry.

(No Model.) 3 Sheets—Sheet 2.

O. B. SHALLENBERGER.
METER FOR ALTERNATING ELECTRIC CURRENTS.

No. 388,003. Patented Aug. 14, 1888.

WITNESSES:

INVENTOR,
Oliver B. Shallenberger.
Att'ys (No Model.) 3 Sheets—Sheet 3.
O. B. SHALLENBERGER.
METER FOR ALTERNATING ELECTRIC CURRENTS.
No. 388,003. Patented Aug. 14, 1888.
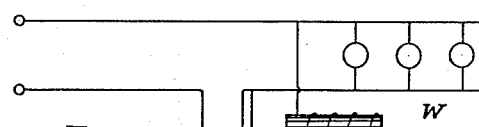
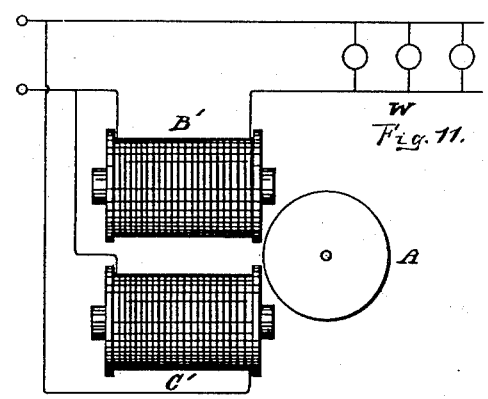
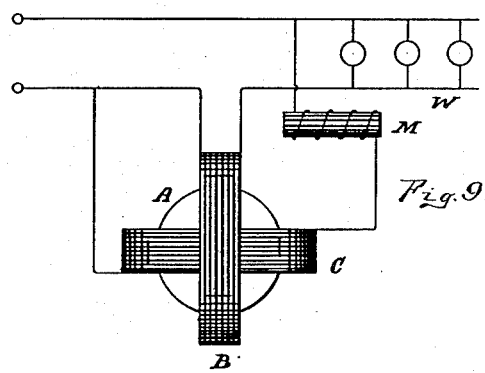
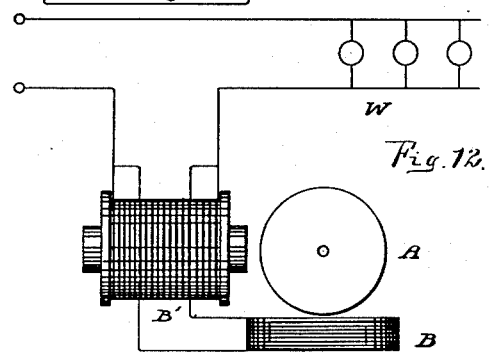
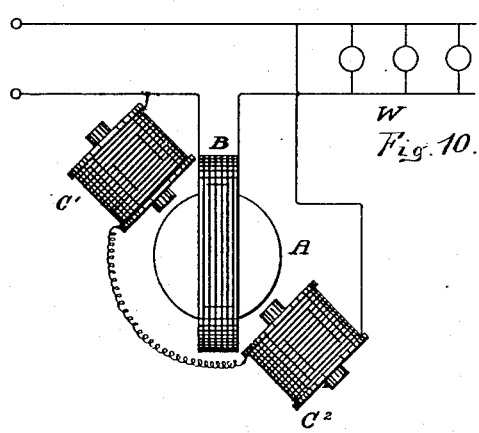
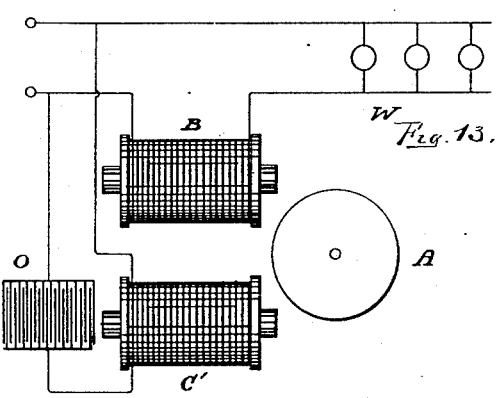
WITNESSES:
INVENTOR,
Oliver B. Shallenberger.
Pope, Edgcomb & Perry
Att'ys.

UNITED STATES PATENT OFFICE.

OLIVER B. SHALLENBERGER, OF ROCHESTER, PENNSYLVANIA.

METER FOR ALTERNATING ELECTRIC CURRENTS.

SPECIFICATION forming part of Letters Patent No. 388,003, dated August 14, 1888.

Application filed June 6, 1888. Serial No. 276,277. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Meters for Alternating Electric Currents, (Case 212,) of which the following is a specification.

The invention relates to the class of apparatus employed for measuring electric currents and recording the amount of electrical energy consumed in any given circuit or portion thereof.

The object of the invention is to provide an efficient meter for alternating electric currents, which shall be reliable in its operation and simple in its construction, which may be manufactured at a small expense, and will not in itself consume an appreciable amount of energy.

Heretofore great difficulty has been experienced in obtaining a record of the consumption of the energy of alternating electric currents. I have discovered a method of converting such electrical energy into continuous mechanical motion, the rate of which is directly proportional to the energy being consumed.

The principal elements employed in the construction of the meter are, first, an armature of metal capable of rotation; second, an electric circuit, which is so arranged that when it is traversed by alternating electric currents a field of force is induced having a given polar line or axis with reference to the armature; and, third, a circuit so related to the first circuit that currents are produced in such second circuit by the action of those in the first, the phases of which succeed those of the currents in the first circuit and set up for the armature a second field of force, the axis of which intersects that of the first. If desired, either or both conductors may be provided with a soft-iron core. The armature may be built of soft iron, or of copper, or other non-magnetic metal, or it may be composed of a core of soft iron having a conducting-circuit of other material surrounding or applied to it. These and other well-known modifications of construction will be well understood by the skilled constructor.

In the accompanying drawings, Figure 1 is a perspective view of a meter embodying the features of the invention, and Figs. 2, 3, 4, 5, 6, 7, 8, 9, 10, 11, 12, and 13 illustrate modified forms of meter apparatus and various modes of connecting the same in the circuit.

Referring to the figures, A represents a circular armature of metal. This may be a ring or disk or other shape, and may be of soft iron or it may be of copper or of other electric conducting material. It is here shown as mounted upon a shaft, $a$, and placed within a coil, B, of insulated electric conducting-wire. The coil is shown as formed in two sections, $b'$ $b''$, for convenience of construction, the shaft $a$ passing between the two. Alternating electric currents traversing this coil tend to establish a field of force whose polar line or axis is approximately in the direction $e$ $e'$. A second conductor, C, is placed in inductive relation to the conductor B and armature A. This conductor is shown as closed upon itself. It is placed with its magnetic axis at an inclination to that of the coil B. Alternating electric currents traversing the conductor C establish a field of force for the armature, whose polar line or magnetic axis is approximately in the direction $ff'$—that is to say, inclined with reference to the polar line of the coil B. It is found in practice that when the coil B is traversed by alternating electric currents the armature will revolve in the direction indicated by the arrow $x$.

In order to produce a rate of rotation of the device proportional to the amount of energy supplied to the circuit, it is necessary that some retarding force should increase in its effect by the same law as that of the rotating effect produced by the current. If, for example, the tendency to rotation increases as the square of the current, then the retarding effect should increase as the square of the speed. Such a definite law of increase of retardation is secured in the present instance by the application of one or more fans or vanes, N N, to the shaft $a$. The resistance offered by the air to the rotation of these vanes affords the required retardation. Any suitable means may be employed for modifying this retarding effect of the fans—as, for instance, by modifying the shape of the inclosing-chamber, which, in practice, will surround the meter. A meter constructed in this manner is found to respond to the currents traversing the coils B in precisely the manner required to obtain a reliable and accurate measurement of the current, the number of revolutions performed in a given time being directly proportional to the current consumed during that time.

The coil B is connected in the circuit in the proper manner to suit the requirements of individual cases. Thus in Fig. 1 it is shown as connected in the circuit L of the generator G in series with the work-circuit W. It is evident, however, that various other well-understood ways of connecting it in circuit may be employed.

It is found, in practice, that the resistance of the coil B may be made very small, and the current consumed in operating the meter itself quite insignificant.

A record of the revolutions of the movable element A is obtained by a counting or registering train, H. This is of any well-known convenient construction. It is coupled with the shaft $a$ by a worm, $h$, upon the shaft, and the wheel $h'$, with which it gears. The wheel $h'$ is in turn geared with the registering-train.

There are numerous other ways of constructing the meter, which may be adopted in practice, examples of which will here be given.

Figure 2:
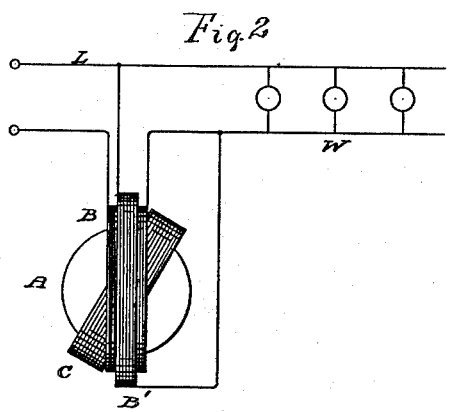

In Fig. 2 the same general arrangement as shown in Fig. 1 is employed; but in addition to the series-coil B there is employed a shunt-coil, B', connected across the conductors leading to the work-circuit. The meter is therefore driven by the resultant effects due to the currents traversing these two coils, in a manner well understood. When employed on a circuit of constant electro-motive force, the shunt-coil may have a small constant effect sufficient to overcome the friction of the registering-train, or in the case of a variable electro-motive force such a coil may be used in connection with a series coil in a Watt meter, or with a constant current the series-coil may be small in effect to overcome friction, the rate of rotation being dependent on the electromotive force—i. e., the number of devices operated on a series-circuit included by the shunt-coil.

Figure 3:
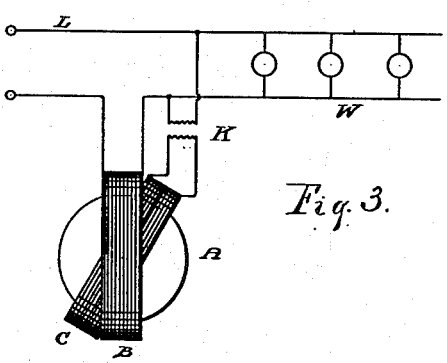
Figure 4:
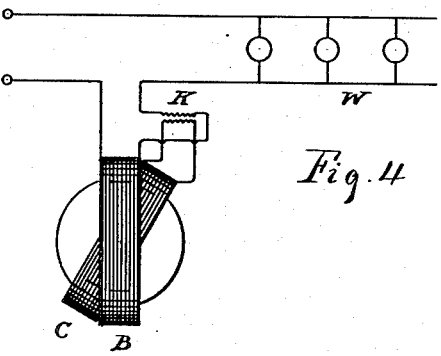

In Fig. 3 the coil C is included in the circuit of a converter, K, the primary of which is connected in shunt upon the work-circuit W. The required difference of phases is obtained by the conversion of the current. In Fig. 4 a similar organization is shown, with the exception that the converter K is connected in series with the coil B instead of in shunt upon it.

Figure 5:
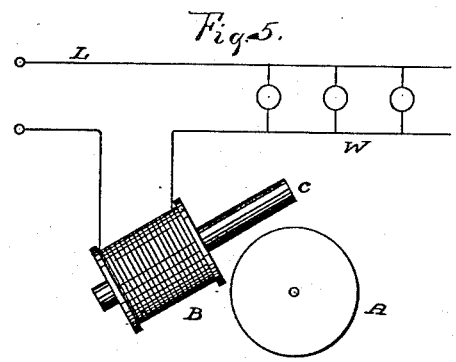
Figure 6:
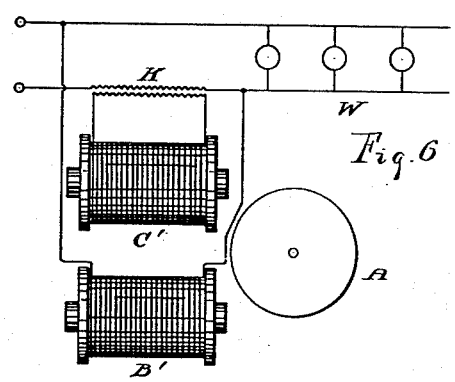
Figure 7:
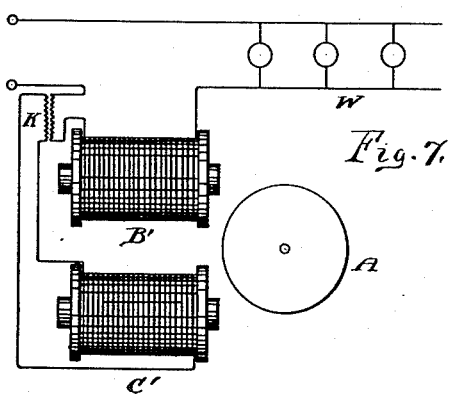

In Fig. 5 a modification is shown, wherein a core, $c$, is employed, in place of the coil C, for the coil B. This core projects beyond the coil, so that its end is presented to the armature in a different radial position from the end of the coil B. The magnetic action of the core and coil here produces rotation of the armature. Two coils, B' C', may be employed, as shown in Fig. 6, each with a core and placed side by side, but presenting their poles to the armature in different radial positions. The coil B' is here connected in shunt upon the work-circuit, and the coil C' is connected in the secondary circuit of the converter K, the primary of which is connected in series with the work-circuit. The converter K may have its primary connected in series with the work-circuit W and the coil B', and its secondary connected through the coils C', as shown in Fig. 7. In this instance each coil is constructed with a core.

In Fig. 8 the two coils B C are shown as in Figs. 1 and 2; but the coils C are connected in shunt upon the work-circuit through a reactive coil, M, which retards the phases of the currents and causes them to succeed those traversing the coil B.

Fig. 9 shows a similar organization, but with the coil C at right angles to the coil B, so that it derives its entire current through the reactive coil.

In Fig. 10 the coil B is connected, as in Fig. 1, and two self-induction coils, C' and C², are connected in series with each other and in shunt upon the work-circuit. These are placed diametrically opposite each other, and are so wound as to present opposite poles to the armature.

In Fig. 11 there are shown two electro-magnets or coils, B' C', having different amounts of self-induction. One of these coils B' is here shown as connected in series with the work-circuit, and the other, C', in shunt thereon. The different self-inductive qualities of the two coils will secure the requisite difference of phases.

In Fig. 12 the coil C' (shown in Fig. 11) is replaced by a coil, B, having little self-induction, and having its terminals connected in shunt upon the coil B'. They are here shown as presenting their polar axes to the armature at right angles.

In Fig. 13 the general plan shown in Fig. 11 is adopted, with the exception that the electric condenser O is introduced in the conductor leading to the coil C'. The effect of this condenser, as is well known, is to change the phase of the current. These coils may be either with or without iron cores, as desired.

These various plans of connecting the coils and securing the required difference of phases may be interchanged, as found desirable, and the various plans of connecting them in circuit with the translating devices may be made to suit the requirements of the individual cases, accordingly as it is desired to employ a meter upon circuits where either the current or the difference of potential is constant, or where both are variable.

Claims are here made to the fundamental features of the apparatus, and in another application of even date herewith, Serial No. 276,278, claims are made to the method of operation, the division being made to comply with the rules of practice of the Patent Office.

I claim as my invention—

1. The combination of a rotating armature, an inducing-circuit polarizing said armature when traversed by alternating electric impulses, a second inducing-circuit receiving currents from the first circuit and polarizing said armature in a different direction, and a counting, registering, or indicating device actuated by the movements of the armature.

2. The combination of a rotating armature, an inducing-circuit polarizing said armature when traversed by alternating electric impulses, a second inducing-circuit receiving currents by induction from the first circuit and polarizing said armature in a different direction, a retarding device applied to the armature, and a counting, registering, or indicating device actuated by the movements of the armature.

3. The combination of a rotating armature, an inducing-circuit polarizing said armature when traversed by alternating electric impulses, a magnetic medium acted upon by the same current and establishing a line of polarization intersecting the first line, and a counting, registering, or indicating device actuated by the movements of the armature.

In testimony whereof I have hereunto subscribed my name this 28th day of May, A. D. 1888.

OLIVER B. SHALLENBERGER.

Witnesses:
C. C. WOLFE,
CHARLES A. TERRY.